Patented Oct. 10, 1944

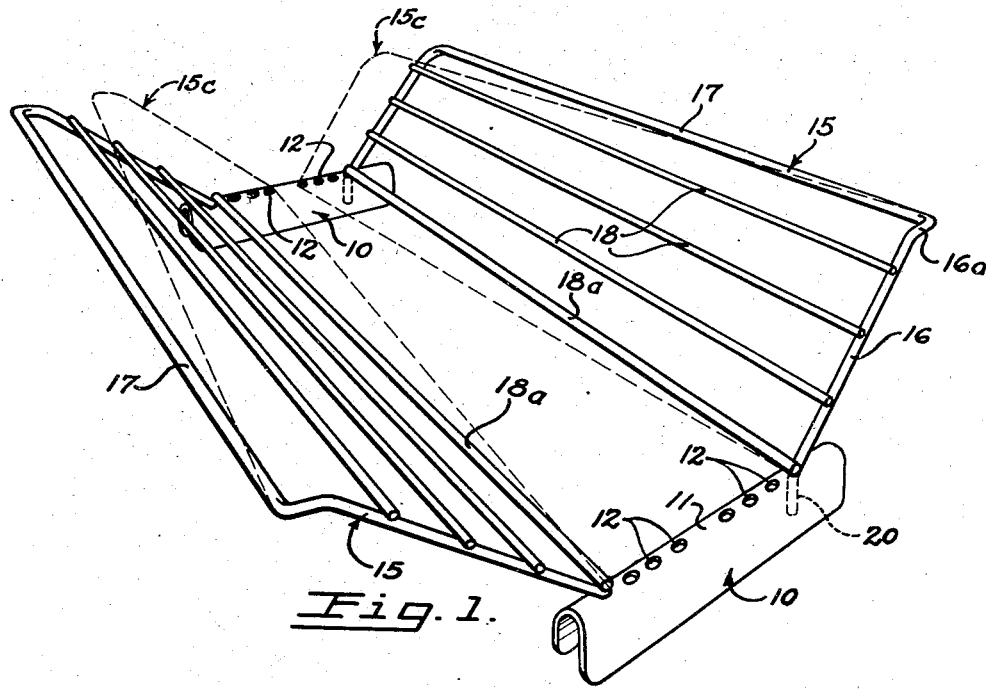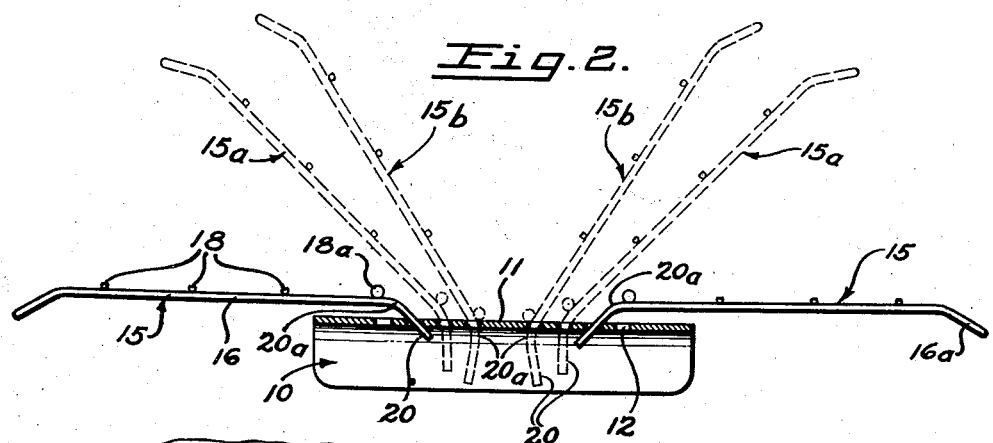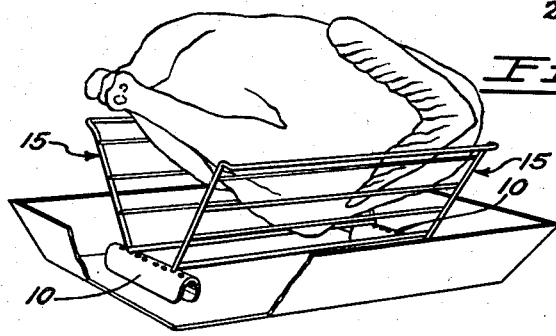

2,360,026

UNITED STATES PATENT OFFICE 2,360,026

COOKING RACK

Harry D. Wall, Pasadena, Calif.

Application March 27, 1944, Serial No. 528,210

2 Claims. (Cl. 99—426)

My invention has to do with cooking racks of the type used for roasting, grilling and similar cooking operations; the general purpose of the invention being to provide a device of maximum simplicity and wide range of adjustment to adapt it to a variety of uses.

Several different types of cooking racks have been previously proposed, but all of them known to me have had some deficiency of structure or of adjustability which prevents their wide range of use with any efficiency; and some of these racks have been too complicated or bulky. A typical adjustable cooking rack comprises a base support or supports and one or more adjustable rack members in the form of grills on which the food (typically meat) is supported. In a rack of that type and having two grill members, my present improved structure allows of easy and quick adjustment of the grills to various positions to suit the cooking operation, and provides for secure support of the grills in all their various positions.

The simple structure which embodies my invention is shown in the accompanying drawing, in which:

Fig. 1 is a perspective of the complete structure;

Fig. 2 is a cross sectional view indicating some of the various positions in which the grills can be placed; and Fig. 3 is a perspective illustrating the rack in use.

The supporting base of my improved rack is formed of two independent base pieces 10, of inverted channel form, easily made from sheet metal. The top, or what may be called the web, 11 of each channel is perforated with a longitudinal series of holes 12, the series extending on both sides of the longitudinal center of the channel or extending substantially from end to end of the channel.

The two grill members 15 are preferably constructed of heavy steel wire or light rod, and consist essentially of a main frame having end legs 16, an outside member 17, and several spaced longitudinal members 18 which are secured at their ends, as by welding or brazing, to legs 16. Outside member 17 may preferably be formed of one piece of rod with legs 16. The innermost member 18a is spaced from the ends of the legs 16; so that the terminal portions of the legs project beyond member 18a to form supporting feet 20 which are inserted in base holes 12 as shown in the drawing. Holes 12 are preferably somewhat larger in diameter than the feet 20, in order to facilitate quick insertion of the feet and also to provide for a binding action which will securely hold the grills in any set position.

Feet 20 are curved in the directions shown in the drawing; that is, they are curved out of the general plane of the grill member in a direction which may be considered as down. This curvature is indicated 20a in the drawing. The outer ends of legs 16 are also similarly curved, as indicated at 16a. The curvature of the supporting feet is important to the variety of adjustability of my rack. The corresponding curvature at 16a facilitates a particular use of the grills, as will appear.

To use the rack, it is set up on or in any suitable support or pan in the general mode of assembly shown in the drawing, one of the most effective uses is for roasting meats. Fig. 3 shows a typical set-up for roasting a turkey or other fowl, where the rack with its supported fowl is placed in a pan. In that illustrated set-up the two grills are set on the bases in about the relative spaced positions shown in full lines in Fig. 1, with the grills at about the relative angle (in end elevation) shown at 15a—15a in Fig. 2 and parallel to each other in plan. In that set-up the grill feet have been placed in corresponding holes in bases 10, and the curved feet have been inserted into the holes far enough to support the grills at the angles indicated at 15a. In that or any other angular slope of the grills they are securely held—particularly when the weight of the roast is on them—by the binding action of the feet in the holes. The holes being larger than the feet, and the hole edges being preferably sharp, the feet bind in them. But at the same time, the grills are easily lifted from the bases, for removal or for adjustment of position.

From what has been said, the adjustment of the grills to any desired vertical angle will be readily understood; the vertical angle at which the grill stands being simply controlled by how far the curved feet are inserted in the base holes. Thus Fig. 2 shows, in full lines, the grills adjusted to a flat angle. In such horizontal positions the inner edges of the two grills can be brought close together by using base holes which are close together. And in such a flat arrangement the rack can be used fully effectively as a flat grill for grilling or toasting, or other similar operations. And I may further remark here that the two grill members may be used, either single or together, as a flat grill, by simply standing them on any suitable support, when the curved portions 20 and 16a will support them on that support.

Fig. 2 indicates in dotted lines at 15a and 15b, the various other vertical angles at which the grills may be adjusted on the bases, as will be understood from what has been said.

In addition to adjustment of vertical angle, or in combination with any adjusted vertical angle, the grills can also be set to any desired relative horizontal angle simply by selection of proper holes 12. For instance, in Fig. 1 the dotted outlines at 15c show the two grills set in non-parallel positions by being mounted at one end in two of the holes 12 which are relatively close together. Any desired horizontal angle may be selected by selecting the corresponding mounting holes. And it will be obvious that the grills may be mounted on the bases in any desired combination of horizontal and vertical angles, which may be accurately selected to suit the shape of the piece being cooked. A lamb roast for instances is accommodated best by such an angular set-up as shown in dotted lines in Fig. 1.

The superior efficacies of my rack are due not only to its great simplicity, but also to its versatility of use which is due to the fact that the grills can be quickly set to any desired vertical angle in combination with any desired horizontal angle. The range of vertical angles depends on the curvature of feet 20 and their fit in holes 12. The proportions shown in Fig. 2 have been found to give a sufficiently wide range and at the same time get good binding support. The range of horizontal angles depends of course on the lengths of bases 10 and their series of holes. The proportions shown in the drawing have been found to give full satisfaction in use.

I claim:

1. In a cooking rack, the combination of two separate base members each having a linear series of spaced openings in their tops, two grill members each composed of an open-work frame having end legs and longitudinal members connecting the legs, the legs having extensions beyond the longitudinal member at one side of the grill forming projecting mounting feet adapted to fit in selected holes in the base members, the projecting mounting feet being curved away from the plane of the grill frame, so that the grills may be set at selected vertical angles on the bases by selected insertion of the curved feet in the base holes.

2. A cooking rack as specified in claim 1, and in which the base holes are of larger size than the curved mounting feet, so that the feet may assume binding positions in the holes.

HARRY D. WALL.